US011068020B2

(12) United States Patent
Handa (10) Patent No.: US 11,068,020 B2
(45) Date of Patent: Jul. 20, 2021

(54) SYNCHRONIZATION SIGNAL OUTPUT APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Masahiro Handa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 62 days.

(21) Appl. No.: 15/971,424

(22) Filed: May 4, 2018

(65) Prior Publication Data
US 2018/0329451 A1 Nov. 15, 2018

(30) Foreign Application Priority Data
May 10, 2017 (JP) .............................. JP2017-094083

(51) Int. Cl.
*G06F 1/14* (2006.01)
*H04N 21/242* (2011.01)
(Continued)

(52) U.S. Cl.
CPC .......... *G06F 1/14* (2013.01); *H04L 29/06047* (2013.01); *H04N 5/073* (2013.01); *H04N 21/21805* (2013.01); *H04N 21/242* (2013.01); *H04N 21/4223* (2013.01); *H04N 21/4305* (2013.01); *H04L 69/28* (2013.01)

(58) Field of Classification Search
CPC ................ G06F 1/14; H04L 29/06047; H04L 21/21805; H04L 69/28; H04N 21/242; H04N 5/073; H04N 21/4223; H04N 21/4305
See application file for complete search history.

(56) References Cited

U.S. PATENT DOCUMENTS 3,588,899 A * 6/1971 Strauch ................. G01S 7/4056
342/87
4,602,375 A * 7/1986 Inukai .................. H04B 7/2048
370/324
(Continued)

FOREIGN PATENT DOCUMENTS

JP   H09238282 A     9/1997
JP   2010187055 A *  2/2009
(Continued)

OTHER PUBLICATIONS

Office Action issued in Japanese Application No. 2017-094083 dated Mar. 26, 2021.

*Primary Examiner* — John A Follansbee
*Assistant Examiner* — Fadi Haj Said
(74) *Attorney, Agent, or Firm* — Rossi, Kimms & McDowell LLP (57) ABSTRACT

A synchronization signal output apparatus obtains time from a time server to synchronize an internal clock with the time of the time server, obtains an error between the time of the time server and time of the internal clock, and generate and output a synchronization signal. The apparatus sets, based on a magnitude of the error, an operation mode for generating and outputting the synchronization signal, and generates and outputs the synchronization signal at the timing that is based on the operation mode.

10 Claims, 5 Drawing Sheets

(51) Int. Cl.
*H04L 29/06* (2006.01)
*H04N 21/218* (2011.01)
*H04N 21/4223* (2011.01)
*H04N 21/43* (2011.01)
*H04N 5/073* (2006.01)

(56) References Cited

U.S. PATENT DOCUMENTS

| | | | | | |
|---|---|---|---|---|---|
| 5,530,846 | A * | 6/1996 | Strong | | G06F 1/14 |
| | | | | | 713/400 |
| 5,870,594 | A * | 2/1999 | Doi | | H04L 7/02 |
| | | | | | 713/401 |
| 6,316,982 | B1 * | 11/2001 | Gutierrez, Jr. | | G06F 1/08 |
| | | | | | 327/160 |
| 6,363,039 | B2 * | 3/2002 | Hayashi | | G11B 7/0956 |
| | | | | | 369/44.28 |
| 6,400,683 | B1 * | 6/2002 | Jay | | H04J 3/0632 |
| | | | | | 370/229 |
| 6,600,797 | B1 * | 7/2003 | Hasegawa | | H03L 7/087 |
| | | | | | 327/156 |
| 6,725,278 | B1 * | 4/2004 | Gonzalez | | H04L 69/32 |
| | | | | | 709/217 |
| 7,257,393 | B2 * | 8/2007 | Akiyama | | H04L 63/0823 |
| | | | | | 342/357.31 |
| 7,411,868 | B2 * | 8/2008 | Kohmoto | | G06F 21/725 |
| | | | | | 368/10 |
| 8,264,421 | B2 * | 9/2012 | Yamada | | H04N 5/0736 |
| | | | | | 345/1.1 |
| 8,427,907 | B2 * | 4/2013 | Shibata | | G06F 1/14 |
| | | | | | 368/46 |
| 8,436,786 | B2 * | 5/2013 | Kamoto | | G06F 3/1446 |
| | | | | | 345/1.1 |
| 8,793,402 | B2 * | 7/2014 | Rodriguez | | H04L 69/28 |
| | | | | | 370/230 |
| 8,812,256 | B2 * | 8/2014 | Lee | | H04J 3/0688 |
| | | | | | 702/89 |
| 8,959,346 | B2 * | 2/2015 | Agrawal | | H04L 63/126 |
| | | | | | 713/169 |
| 9,008,251 | B2 * | 4/2015 | Chen | | G06F 1/04 |
| | | | | | 307/43 |
| 9,013,852 | B2 * | 4/2015 | Maehara | | H01H 9/54 |
| | | | | | 361/115 |
| 9,219,938 | B2 * | 12/2015 | Snow | | H04N 21/4305 |
| 9,798,515 | B1 * | 10/2017 | Mendes | | G06F 3/165 |
| 10,015,769 | B1 * | 7/2018 | Younis | | G01S 5/10 |
| 10,222,482 | B2 * | 3/2019 | Shimada | | G01S 19/39 |
| 10,393,808 | B2 * | 8/2019 | Chen | | G01R 31/31709 |
| 2001/0022823 | A1 * | 9/2001 | Renaud | | H04B 7/2125 |
| | | | | | 375/359 |
| 2002/0069299 | A1 * | 6/2002 | Rosener | | G06F 1/14 |
| | | | | | 709/248 |
| 2003/0202804 | A1 * | 10/2003 | Hasegawa | | H03L 7/087 |
| | | | | | 398/202 |
| 2004/0223515 | A1 * | 11/2004 | Rygielski | | G04G 7/00 |
| | | | | | 370/503 |
| 2005/0125717 | A1 * | 6/2005 | Segal | | G06F 40/171 |
| | | | | | 715/201 |
| 2005/0174981 | A1 * | 8/2005 | Heath, Jr. | | H04W 16/14 |
| | | | | | 370/342 |
| 2005/0181722 | A1 * | 8/2005 | Kopra | | H04H 20/18 |
| | | | | | 455/2.01 |
| 2005/0234695 | A1 * | 10/2005 | Wang | | G06F 30/3312 |
| | | | | | 703/19 |
| 2006/0072695 | A1 * | 4/2006 | Iwamura | | H04B 1/66 |
| | | | | | 375/354 |
| 2006/0076993 | A1 * | 4/2006 | Teo | | H03K 5/13 |
| | | | | | 327/165 |
| 2006/0194573 | A1 * | 8/2006 | Akiyama | | H04L 63/0823 |
| | | | | | 455/414.3 |
| 2006/0195697 | A1 * | 8/2006 | Akiyama | | H04L 9/3297 |
| | | | | | 713/178 |
| 2006/0251126 | A1 * | 11/2006 | Jen | | H04J 3/0632 |
| | | | | | 370/503 |
| 2008/0033615 | A1 * | 2/2008 | Khajepour | | B60W 10/20 |
| | | | | | 701/42 |
| 2009/0177248 | A1 * | 7/2009 | Roberts | | G06Q 50/22 |
| | | | | | 607/60 |
| 2011/0135010 | A1 * | 6/2011 | Najeeb | | H04N 21/2368 |
| | | | | | 375/240.28 |
| 2011/0148518 | A1 * | 6/2011 | Lejon | | H03F 1/0205 |
| | | | | | 330/124 R |
| 2012/0112668 | A1 * | 5/2012 | Van de Sluis | | H05B 47/11 |
| | | | | | 315/312 |
| 2012/0243357 | A1 * | 9/2012 | Yamauchi | | G11C 11/5692 |
| | | | | | 365/205 |
| 2013/0010909 | A1 * | 1/2013 | Huang | | H03L 7/06 |
| | | | | | 375/368 |
| 2014/0125834 | A1 * | 5/2014 | Oya | | G08B 13/19602 |
| | | | | | 348/222.1 |
| 2014/0379922 | A1 * | 12/2014 | Xiao | | H04L 47/70 |
| | | | | | 709/226 |
| 2015/0102239 | A1 * | 4/2015 | Yanagida | | H05G 2/008 |
| | | | | | 250/504 R |
| 2018/0017945 | A1 * | 1/2018 | Sidhu | | A61G 7/018 |
| 2018/0034549 | A1 * | 2/2018 | Kikuchi | | H04B 10/697 |
| 2018/0355814 | A1 * | 12/2018 | Magner | | F02D 41/221 |
| 2019/0036177 | A1 * | 1/2019 | Nagato | | G01R 31/3647 |
| 2019/0238910 | A1 * | 8/2019 | Amidei | | H04N 21/2387 |

FOREIGN PATENT DOCUMENTS

| | | | |
|---|---|---|---|
| JP | 2010-187055 | * | 8/2010 |
| JP | 2010187055 A | * | 8/2010 |
| JP | 2010187055 A | * | 8/2010 |
| JP | 2010187055 A | | 8/2010 |
| JP | 2016123009 A | | 7/2016 |
| KR | 20000020587 A | * | 9/1998 |
| KR | 20000020587 A | * | 4/2000 |

* cited by examiner

SYNCHRONIZATION SIGNAL OUTPUT APPARATUS, CONTROL METHOD, AND NON-TRANSITORY COMPUTER-READABLE STORAGE MEDIUM

BACKGROUND OF THE INVENTION

Field of the Invention

The present invention relates to a technique of generating a synchronization signal for synchronizing a plurality of apparatuses.

Description of the Related Art

A technique of capturing an object from a plurality of points of view using a plurality of cameras placed at different positions, and generating a virtual point-of-view content that gives a user a realistic feeling using images captured and obtained from the plurality of points of view has received attention. When generating such virtual point-of-view content, it is necessary to synchronize video signals captured by the plurality of cameras. To do this, broadcasting/professional cameras have a function of matching the phases and frequencies of video signals among the plurality of cameras by establishing synchronization using an externally input reference signal, and can establish synchronization for generation of a virtual point-of-view content by the function. Note that the reference signal is called a Generator Lock signal (GenLock signal). Japanese Patent Laid-Open No. 2010-187055 describes a method of establishing synchronization of a plurality of video apparatuses using a method of separating time information from a received digital broadcast to generate a synchronization signal synchronized with the time information in order to establish synchronization.

The technique described in Japanese Patent Laid-Open No. 2010-187055 does not consider a jitter of time information when receiving digital broadcast data. In particular, if the distance between the generation source of the time information and the receiver of the digital broadcast is long or if the time information reaches the receiver from the generation source via a plurality of nodes, a jitter of the time information can be large. If a synchronization signal is generated based on the time information having a large jitter, a large jitter may be generated in the synchronization signal, thereby degrading the function of the synchronization signal.

SUMMARY OF THE INVENTION

The present invention reduces the influence of a jitter of time information when generating a synchronization signal based on the time information.

According to one aspect of the present invention, there is provided a synchronization signal output apparatus, comprising: an obtaining unit configured to obtain time from a time server to synchronize an internal clock with the time of the time server, and obtain an error between the time of the time server and time of the internal clock; an output unit configured to generate and output a synchronization signal; and a setting unit configured to set, based on a magnitude of the error, an operation mode of the output unit associated with adjustment of a timing; wherein the output unit generates and outputs the synchronization signal at the timing that is based on the operation mode set by the setting unit.

According to another aspect of the present invention, there is provided a synchronization signal output apparatus for outputting a synchronization signal for synchronizing image capturing operations by a plurality of image capturing apparatuses, comprising: a clock unit configured to measure time; an obtaining unit configured to obtain time from a time server; and an output unit configured to output the synchronization signal at different timings when a difference between the time measured by the clock unit and the time obtained by the obtaining unit is a first value and when the difference is a second value different from the first value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Configuration)

An example of the configuration of a system according to the embodiment will be described with reference to FIG. 1. This system includes, for example, a plurality of image capturing apparatuses 103a to 103z, a plurality of synchronization signal output apparatuses 101a to 101z respectively corresponding to the plurality of image capturing apparatuses 103a to 103z, and a time server 102. In addition, this system may comprise a generation unit (not shown) that generates a virtual point-of-view image (a virtual point-of-view video) based on a plurality of captured images (captured videos) obtained by performing image capturing from a plurality of directions by the plurality of image capturing apparatuses 103a to 103z. Note that each of the plurality of synchronization signal output apparatuses 101a to 101z is connected to the time server 102 via a network 104. Note that each of the plurality of synchronization signal output apparatuses 101a to 101z may be directly connected to the time server 102 by a wired line or wireless channel, or connected to the time server 102 via another apparatus on the network 104. The plurality of image capturing apparatuses 103a to 103z are connected to the corresponding synchronization signal output apparatuses 101a to 101z using wired lines or wireless channels 105a to 105z, respectively. Note that the synchronization signal output apparatuses 101a to 101z, the image capturing apparatuses 103a to 103z, and the lines or channels 105a to 105z will be referred to as the synchronization signal output apparatuses 101, the image capturing apparatuses 103, and the lines or channels 105, respectively, hereinafter, when it is unnecessary to particularly distinguish between them.

The synchronization signal output apparatus 101 executes synchronization processing with time held by the time server 102 via the network 104 using, for example, a time synchronization protocol such as NTP or IEEE1588 PTP. Note that NTP stands for Network Time Protocol, and PTP stands for Precision Time Protocol. The synchronization signal output apparatus 101 outputs a synchronization signal to the corresponding image capturing apparatus 103 via the line or channel 105 based on time information obtained as a result of executing the synchronization processing. In an example, after establishing time synchronization with the time held by the time server 102, the synchronization signal output apparatus 101 generates a synchronization signal based on the time information and outputs it to the image capturing apparatus 103. The output synchronization signal is, for example, a signal in a form processed as a GenLock signal in the image capturing apparatus 103. When all the synchronization signal output apparatuses 101 align timings of starting to output the synchronization signals, all the image capturing apparatuses 103 can perform image capturing at the same time in synchronism with each other. Note that, for example, a control server (not shown) that controls time at which the plurality of synchronization signal output apparatuses 101 output the synchronization signals and the like may be used. For example, the control server can notify each synchronization signal output apparatus 101 of the time at which the synchronization signal is output, and the synchronization signal output apparatus 101 can start to output the synchronization signal at the notified time. Since the synchronization signal output apparatuses 101 have established time synchronization with the time server 102, when the control server instructs synchronization signal transmission start time, the plurality of synchronization signal output apparatuses 101 can align timings of starting to output the synchronization signals. Note that after the start of outputting the synchronization signal, each synchronization signal output apparatus 101 can continue outputting the synchronization signal while correcting a timing of generating the synchronization signal based on the time synchronized with the time server. This allows the plurality of image capturing apparatuses 103 to perform image capturing at the common timing while ensuring time synchronization.

Figure 1:
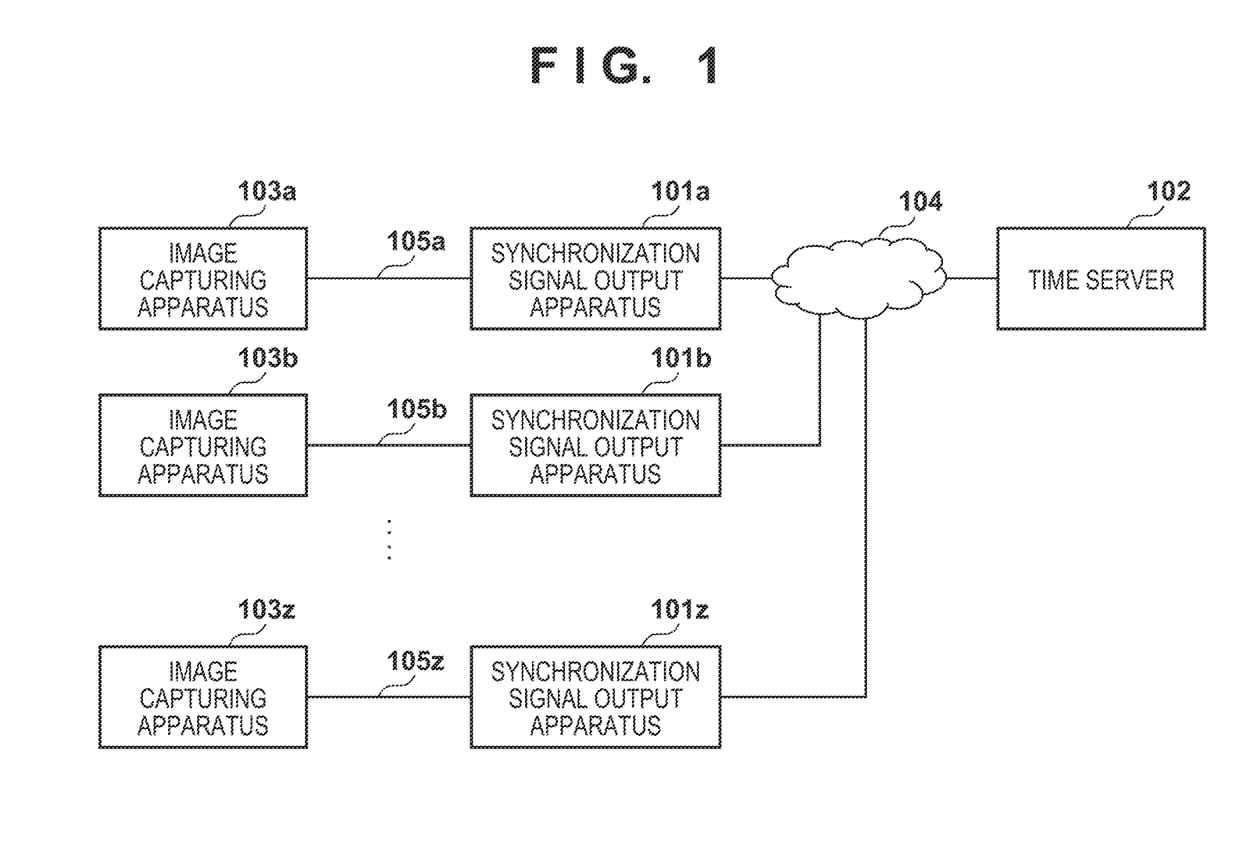
FIG. 1 a view showing an example of the configuration of a network.

Note that FIG. 1 shows an example in which the synchronization signal output apparatus 101 and the image capturing apparatus 103 are formed as separate apparatuses. However, the synchronization signal output apparatus 101 and the image capturing apparatus 103 may be formed as a single apparatus by, for example, including the synchronization signal output apparatus 101 in the image capturing apparatus 103. Although the plurality of synchronization signal output apparatuses 101 exist in FIG. 1, one synchronization signal output apparatus 101 may exist. Furthermore, FIG. 1 shows an example in which one synchronization signal output apparatus 101 corresponds to one image capturing apparatus 103. However, one synchronization signal output apparatus 101 may output a synchronization signal to a plurality of image capturing apparatuses 103. That is, the number of synchronization signal output apparatuses 101 is not limited.

The time server 102 is a server that distributes, via the network 104, information of the current time held in the self apparatus, in accordance with a protocol such as NTP or IEEE1588 PTP. For example, the time server 102 obtains the current time from GPS, a standard radio wave, or an atomic clock, and distributes the obtained current time. Note that instead of distributing the current time, the time server 102 may distribute, as time information, information of an elapsed time after the time set in the self apparatus. The protocol used when the time server 102 distributes the time information is not limited to NTP or PTP, and another method may be used.

The image capturing apparatus 103 is an apparatus that performs image capturing based on the synchronization signal input from the synchronization signal output apparatus 101. Note that the image capturing apparatus 103 can perform image capturing without using the synchronization signal. However, when performing image capturing in synchronism with another image capturing apparatus 103, the image capturing apparatus 103 establishes time synchronization with the other image capturing apparatus 103 using, for example, the synchronization signal according to this embodiment. A video captured by the image capturing apparatus 103 may be either a moving image or a still image, and may include data such as a sound. The video captured by the image capturing apparatus 103 can be saved in a storage incorporated in the image capturing apparatus 103 or the synchronization signal output apparatus 101, a server accessible via the network 104, or a storage on a cloud. It is possible to generate a virtual point-of-view content based on videos synchronously captured by the plurality of image capturing apparatuses 103 and accumulated. Note that the videos captured by the image capturing apparatuses 103 may be used to generate a free point-of-view content in real time without being saved in a storage.

The network 104 is a communication network that allows transmission/reception of signals between the apparatuses such as the synchronization signal output apparatuses 101 and the time server 102 by, for example, a wired line, a wireless channel using Wi-Fi®, Bluetooth®, or the like, or a combination thereof. The network 104 can include a relay apparatus such as a hub, a wireless LAN station, or a PC that can relay data between the plurality of synchronization signal output apparatuses 101 and the time server 102. Note that FIG. 1 shows an example in which each of the plurality of synchronization signal output apparatuses 101 is connected to the network 104. However, the present invention is not limited to this. For example, the system may be configured so that the plurality of synchronization signal output apparatuses 101 may be cascade-connected and one of the plurality of synchronization signal output apparatuses 101 is connected to the time server 102 via the network 104.

The line or channel 105 is a coaxial cable such as a BNC cable that connects the synchronization signal output apparatus 101 and the image capturing apparatus 103, a different kind of wired line, or a wireless channel such as close proximity wireless communication.

It is known that if time synchronization is established via the network 104, as shown in FIG. 1, the time synchronization accuracy lowers due to the number of relay apparatuses on the network 104 and a latency and a jitter when each relay apparatus relays data. To solve this problem, NTP provides a mechanism in which using a hierarchical structure called stratum, the top-level NTP server obtains the standard time from an accurate clock such as GPS and a lower-level NTP server adjusts time with reference to the standard time. With this mechanism, it is expected that even a low-level NTP server distributes high-accuracy time. However, the time synchronization accuracy is lower for a lower-level NTP server. In PTP, it is possible to distribute high-accuracy time even via a plurality of relay apparatuses using the BC (Boundary Clock) or TC (Transparent Clock) mechanism. However, to establish time synchronization between the time server 102 and the synchronization signal output apparatus 101 with high accuracy, all the relay apparatuses that relay communication between the apparatuses need to have a high-accuracy BC or TC function. If the plurality of synchronization signal output apparatuses 101 are cascade-connected, the synchronization signal output apparatus 101 can implement both high-accuracy time synchronization and a relay by having OC (Ordinary Clock) and BC or TC. If a relay apparatus supporting no BC or TC exists in the middle of a relay path, it is impossible to distribute the time to apparatuses on the downstream side of the relay apparatus. Even if all the relay apparatuses support BC or TC, if the relay apparatus has low performance, the time accuracy may degrade.

The synchronization signal output apparatus 101 generally generates a synchronization signal based on time information, and outputs it. If, as a result, the accuracy of the time information is low and a large jitter is generated, the synchronization signal may also fluctuate by tracking the large jitter. To cope with this, the synchronization signal output apparatus 101 according to this embodiment performs control to, if an error of the time information is large, prevent the synchronization signal from tracking the time information, and if an error of the time information is sufficiently small, make the synchronization signal track the time information. This makes it possible to prevent a large jitter of the synchronization signal from being generated in accordance with a jitter of the time information when the accuracy of the time information is low and a jitter is large. Note that the synchronization signal output apparatus 101 may switch between a mode of making the synchronization signal track the time information with high accuracy and a mode of making the synchronization signal track the time information with low accuracy in accordance with the magnitude of the error of the time information. That is, if the magnitude of the error of the time information is equal to or smaller than the first predetermined value, the synchronization signal output apparatus 101 can make the synchronization signal track the time information with high accuracy. If the magnitude of the error of the time information is larger than the first predetermined value and equal to or smaller than the second predetermined value, the synchronization signal output apparatus 101 can make the synchronization signal track the time information with low accuracy. In this case, if the magnitude of the error of the time information is larger than the second predetermined value, the synchronization signal output apparatus 101 can execute control to prevent the synchronization signal from tracking the time information. Examples of the arrangement and processing of the synchronization signal output apparatus 101 that executes the above processing will be further described below.

(Arrangement of Synchronization Signal Output Apparatus)

Figure 2:
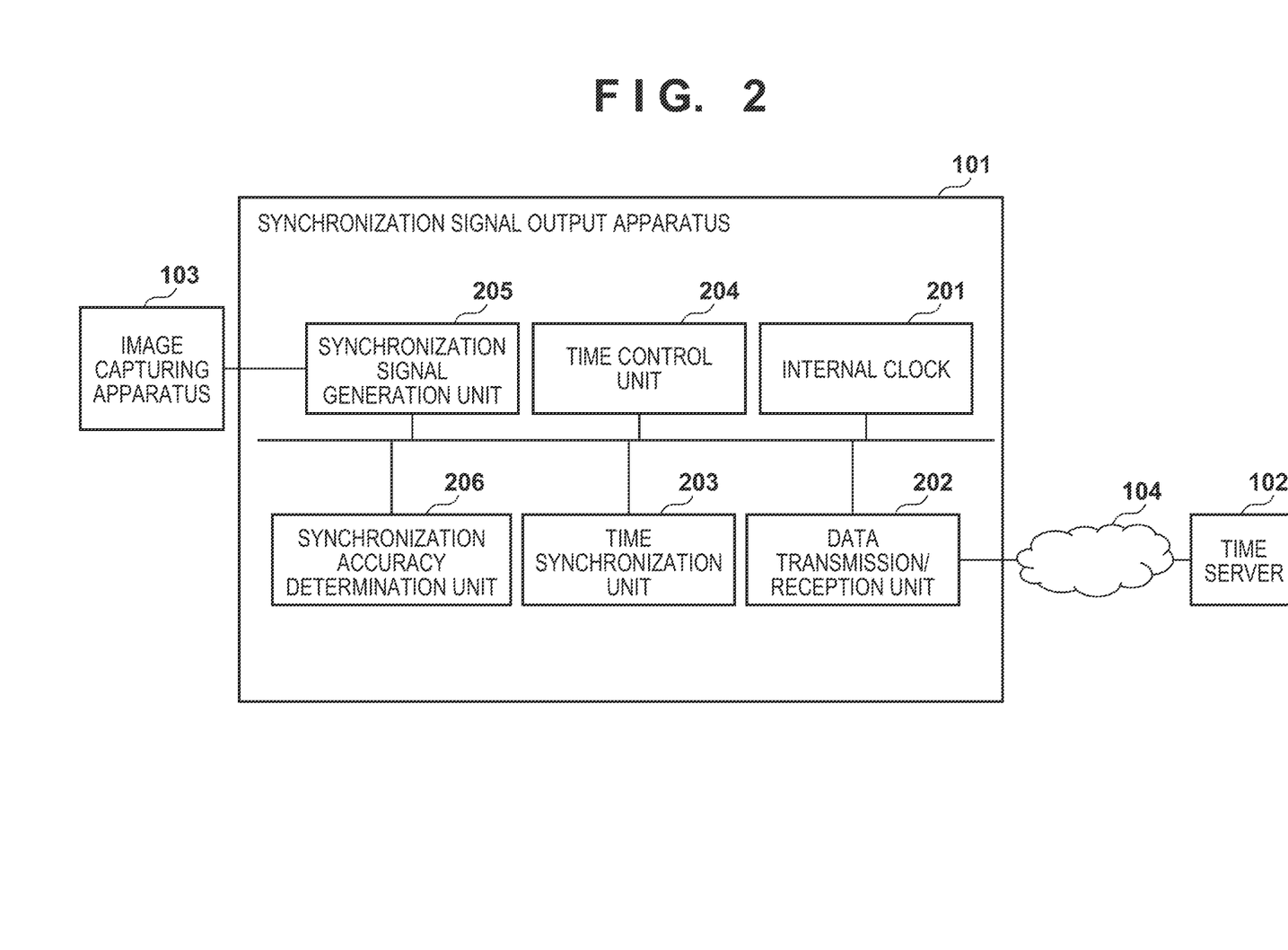
FIG. 2 is a block diagram showing an example of the arrangement of a synchronization signal output apparatus.

FIG. 2 is a block diagram showing an example of the arrangement of the synchronization signal output apparatus 101 according to this embodiment. The arrangement shown in FIG. 2 can be implemented when, for example, one or more processors such as a CPU executes a program stored in a storage device such as a ROM or RAM, unless otherwise specified. Note that the ROM indicates a read only memory, the RAM indicates a random access memory, and the CPU indicates a central processing unit. Note that as the processor, for example, a processor other than the CPU, such as an ASIC (Application Specific Integrated Circuit), FPGA (Field Programmable Gate Array), or DSP (Digital Signal Processor) may be used. The example of the arrangement shown in FIG. 2 is presented for the descriptive purpose. Other functional components may be included in addition to functions shown in FIG. 2. If possible, at least some of the functions shown in FIG. 2 may be omitted/integrated.

In an example, the synchronization signal output apparatus 101 includes an internal clock 201, a data transmission/reception unit 202, a time synchronization unit 203, a time control unit 204, a synchronization signal generation unit 205, and a synchronization accuracy determination unit 206.

The internal clock 201 is, for example, a hardware clock holding the current time. For example, based on a hardware clock, the internal clock 201 periodically outputs a reference signal as a time reference in the synchronization signal output apparatus 101. The data transmission/reception unit 202 transmits/receives data to/from the time server 102 via the network 104. The data transmission/reception unit 202 can be, for example, a NIC (Network Interface Card). However, the present invention is not limited to this, and another component capable of transmitting/receiving data to/from the time server 102 may be used. The data transmission/reception unit 202 complies with, for example, the IEEE1588 standard and has a function of saving a time stamp obtained when transmitting/receiving data to/from the time server 102. The function of the internal clock 201 may be included in the data transmission/reception unit 202.

By, for example, a method complying with the IEEE1588 standard, the time synchronization unit 203 obtains time information from the time server 102, and synchronizes the internal clock 201 with the time in the time server. Note that the time synchronization unit 203 may establish time synchronization with the time server 102 by a proprietary protocol or another standard such as the NTP or EtherAVB standard, instead of the IEEE1588 standard. Even if the IEEE1588 standard is used, the time synchronization unit 203 may comply with the current or future standard such as IEEE1588-2002 or IEEE1588-2008. Note that the standard for time synchronization by IEEE1588-2008 is also called PTPv2 (Precision Time Protocol Version 2). For example, the time synchronization unit 203 can calculate an error (offset) with respect to the time of the time server 102 by transmitting/receiving data to/from the time server 102 and calculating a transmission delay between the time server 102 and the synchronization signal output apparatus 101. Note that the time synchronization unit 203 can hold the calculated error, and supplies information of the error to the time control unit 204 and the synchronization accuracy determination unit 206 (both of which will be described later).

The time control unit 204 adjusts the internal clock 201 based on the time of the time server 102 obtained by the time synchronization unit 203 and the time error between the time server 102 and the synchronization signal output apparatus 101. For example, the time control unit 204 defines a threshold for the error with respect to the time held by the time server 102. If the error is larger than the threshold, the time control unit 204 largely changes the time of the internal clock 201; otherwise, the time control unit 204 gradually corrects the time of the internal clock 201. If the distance between the synchronization signal output apparatus 101 and the time server 102 is long, or if many intermediate nodes exist between the synchronization signal output apparatus 101 and the time server 102, a jitter of a transmission delay with respect to the time server 102 may become large. By making the threshold large when the jitter is large, and making the threshold small when the jitter is small, the time control unit 204 can shorten the time taken to establish synchronization with the time of the time server 102. The threshold may be dynamically changed.

The synchronization signal generation unit 205 generates a synchronization signal, and outputs it to the image capturing apparatus 103. Note that the synchronization signal can be a GenLock signal. However, the present invention is not limited to this, and an arbitrary periodic signal can be used as a synchronization signal. The synchronization signal generation unit 205 includes, for example, a crystal oscillator such as a VCXO (Voltage Controlled Crystal Oscillator) or TCXO (Temperature Compensated Crystal Oscillator), and a ceramic resonator. The synchronization signal generation unit 205 may include a PLL (Phase Locked Loop) formed by combining a phase comparator and the like for generating a stable synchronization signal. Furthermore, to improve the accuracy, the synchronization signal generation unit 205 may be configured to apply in advance a correction value for correcting the individual difference of the crystal oscillator. Note that if possible in terms of downsizing/simplification of a circuit, the synchronization signal generation unit 205 may use a high-accuracy atomic clock or the like.

For example, the synchronization signal generation unit 205 generates an internal signal of the same frequency as that of the reference signal generated by the internal clock 201, and adjusts a timing of generating a synchronization signal based on a phase difference between the internal signal and the reference signal. For example, the synchronization signal generation unit 205 adjusts the frequency of the internal signal in accordance with the phase difference using an integer constant applied with an adjustment value proportional to an instantaneous phase difference and a proportionality constant applied with a value obtained by integrating the past phase difference, thereby generating a synchronization signal from the internal signal. For example, using a positive value α smaller than 1, the synchronization signal generation unit 205 calculates α×(integer constant)+(1−α)×(proportionality constant). Then, for example, if the phase difference increases in a direction in which the internal signal is delayed with respect to the reference signal, the synchronization signal generation unit 205 performs adjustment to increase the frequency of the internal signal in accordance with the calculated value. On the other hand, if the phase difference increases in a direction in which the internal signal advances with respect to the reference signal, the synchronization signal generation unit 205 performs adjustment to decrease the frequency of the internal signal in accordance with the calculated value. Note that as α is larger (closer to 1), the frequency is adjusted by tracking the instantaneous phase difference, and as α is smaller (closer to 0), the frequency is adjusted to gradually change in accordance with the cumulative value of the phase differences in a past predetermined section, instead of tracking the instantaneous phase difference. The proportionality constant may be updated by the above-described calculated value (α×(integer constant)+(1−α)×(proportionality constant)). This allows the synchronization signal generation unit 205 to generate a synchronization signal by tracking the variation of the internal clock 201 adjusted by the time control unit 204, and output the synchronization signal.

Note that if a jitter of the reference signal generated by the internal clock 201 is large, that is, for example, a jitter of the transmission delay with respect to the time server 102 is large, a fluctuation of the frequency of the reference signal generated by the internal clock 201 is large. As a result, the phase difference between the internal signal and the reference signal fluctuates. If the phase difference is fed back to the internal signal, the generation timing of the synchronization signal may largely fluctuate. Consequently, the image capturing apparatus 103 may not be able to perform image capturing stably.

The synchronization accuracy determination unit 206 determines the magnitude of the time error between the time server 102 and the synchronization signal output apparatus 101, that is held in the time synchronization unit 203. Then, in accordance with the determination result, the synchronization accuracy determination unit 206 sets an adjustment mode of the internal signal generated by the synchronization signal generation unit 205.

(Processing Procedure)

Figure 3:
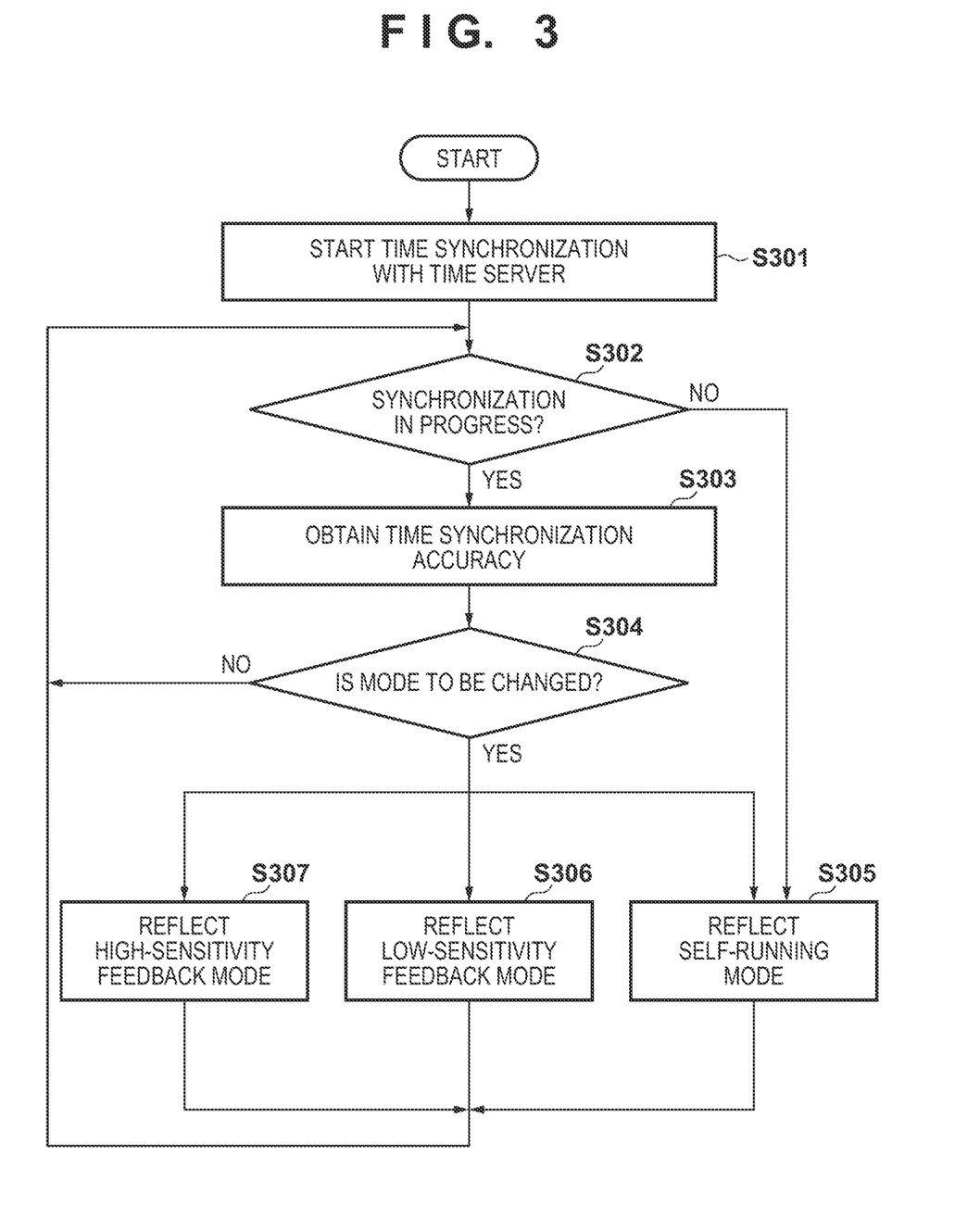
FIG. 3 is a flowchart illustrating an example of a processing procedure executed by the synchronization signal output apparatus.

An example of a processing procedure executed by the synchronization signal output apparatus 101 according to this embodiment will be described with reference to FIG. 3. In this processing, the time synchronization unit 203 starts time synchronization processing with the time server 102 via the data transmission/reception unit 202 (step S301).

The time synchronization unit 203 calculates the time error between the synchronization signal output apparatus 101 and the time server 102, and supplies it to the time control unit 204. The time control unit 204 adjusts the internal clock 201 based on the error. After that, the time control unit 204 determines whether the result of executing the time synchronization processing with the time server 102 has been reflected on the internal clock 201 (step S302). That is, the time control unit 204 determines whether the time error between the time server 102 and the internal clock 201 falls within a range of thresholds (to be described later) (for example, thresholds 405 and 406 (to be described later)). The thresholds for the error may be varied in accordance with the size and moving speed of an object captured by the image capturing apparatuses 103. If, for example, the object is large or the moving speed of the object is low, the synchronization accuracy when the image capturing apparatuses 103 perform image capturing at the same time need not be high, and thus the thresholds are set large. Conversely, if the object is small or the moving speed of the object is high, the synchronization accuracy when the image capturing apparatuses 103 perform image capturing at the same time needs to be high, and thus the thresholds can be set small. If it is determined that the error is larger than the thresholds 405 and 406 (to be described later), and time synchronization cannot be maintained between the synchronization signal output apparatus 101 and the time server 102 with predetermined accuracy (NO in step S302), the process advances to step S305. On the other hand, if it is determined that time synchronization can be maintained with predetermined accuracy (YES in step S302), the process advances to step S303.

In step S303, the synchronization accuracy determination unit 206 obtains, from the time synchronization unit 203, information of the time difference (error) between the synchronization signal output apparatus 101 and the time server 102. In accordance with the obtained information of the error, the synchronization accuracy determination unit 206 determines whether to change an operation mode when the synchronization signal generation unit 205 adjusts the internal signal based on the phase difference with respect to the reference signal of the internal clock 201 (step S304). If the mode is not to be changed (NO in step S304), the process returns to step S302. If, for example, the obtained error is larger than the thresholds 405 and 406 (to be described later), the synchronization accuracy determination unit 206 advances the process to step S305. On the other hand, if the obtained error is smaller than the thresholds 405 and 406 (to be described later) and larger than other thresholds (thresholds 403 and 404 (to be described later)) smaller than the thresholds 405 and 406, the synchronization accuracy determination unit 206 advances the process to step S306. If the obtained error is smaller than the other thresholds 403 and 404, the synchronization accuracy determination unit 206 advances the process to step S307.

In step S305, a self-running mode is set in which the synchronization signal generation unit 205 does not update the internal signal based on the phase difference between the internal signal and the reference signal generated by the internal clock 201. For example, in the self-running mode, the synchronization signal generation unit 205 may not feed back the phase difference when generating the internal signal or may ignore information of the fed back phase difference. Note that if a synchronization signal is continuously generated for a long time in the self-running mode, the period for generating the synchronization signal may be gradually shifted in accordance with the accuracy of the internal signal generated by the synchronization signal generation unit 205. Thus, if the operation in the self-running mode continues for a predetermined period or longer, a video captured by the image capturing apparatus 103 that operates based on the synchronization signal output from the synchronization signal output apparatus 101 need not be used to, for example, generate a free point-of-view content.

In step S306, a low-sensitivity feedback mode is set in which the synchronization signal generation unit 205 generates the synchronization signal by adjusting the internal signal with low sensitivity with respect to the phase difference between the internal signal and the reference signal generated by the internal clock 201. In step S307, a high-sensitivity feedback mode is set in which the synchronization signal generation unit 205 generates the synchronization signal by adjusting the internal signal with high sensitivity with respect to the phase difference between the internal signal and the reference signal generated by the internal clock 201.

Figure 4:
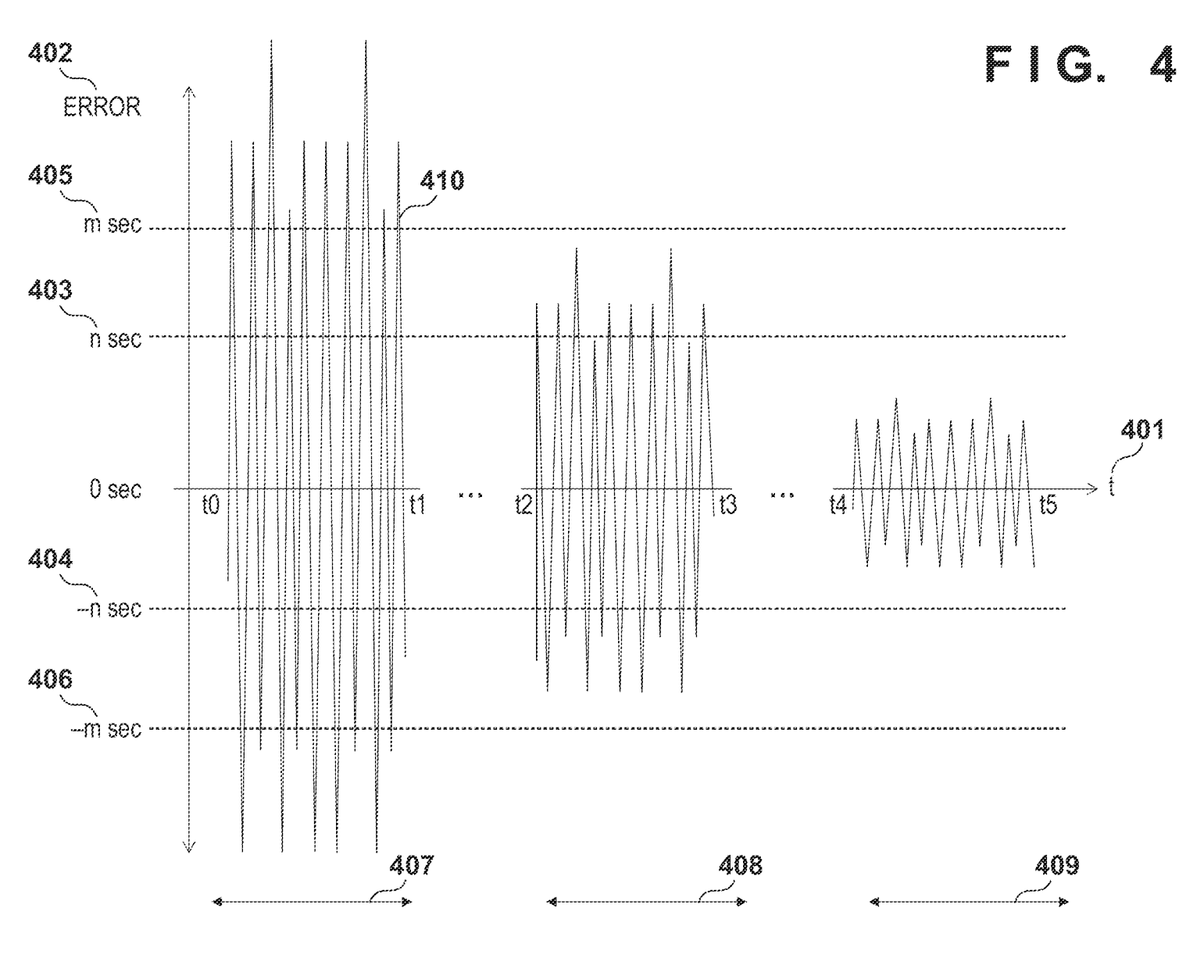
FIG. 4 is a timing chart showing a time error between an internal clock and a time server.

Determination by the synchronization accuracy determination unit 206 at this time will be described with reference to FIG. 4. In FIG. 4, the abscissa represents an elapsed time 401, and the ordinate represents an error 402 between the time of the time server 102 and the time of the internal clock 201. A curve 410 indicates a temporal change of the error between the time of the time server 102 and the time of the internal clock 201, which has been calculated by the time synchronization unit 203. The time synchronization unit 203 periodically executes time synchronization processing with the time server 102 by PTP, and corrects the internal clock 201 using the time difference between the time server 102 and the internal clock 201 based on the result of the time synchronization processing. This can establish time synchronization between the synchronization signal output apparatus 101 and the time server 102. At this time, to eliminate the time difference from the time server 102, the detected error may be applied to the internal clock 201 intact or a correction amount obtained by weighting the integration of some past errors and the error detected at the timing may be applied to the internal clock 201.

The thresholds 403 to 406 indicate thresholds of the time error between the time server 102 and the internal clock 201. Note that the magnitudes of the thresholds 403 and 404 correspond to an error of n sec and the magnitudes of the thresholds 405 and 406 correspond to an error of m sec where m>n. In FIG. 4, since the error is very large (the magnitude of the error exceeds m sec) during a period 407 from time t0 to time t1, the synchronization accuracy determination unit 206 selects the self-miming mode as the operation mode. On the other hand, since the error is sufficiently small (the magnitude of the error is equal to or smaller than n sec) during a period 409 from time t4 to time t5, the synchronization accuracy determination unit 206 selects the high-sensitivity feedback mode as the operation mode. Since the error is not sufficiently small during a period 408 from time t2 to time t3 but falls within a predetermined range (the magnitude of the error exceeds n sec but is equal to or smaller than m sec), the synchronization accuracy determination unit 206 selects the low-sensitivity feedback mode as the operation mode. Note that the thresholds m and n may be dynamically changed in accordance with conditions such as an image capturing target, image capturing location, image capturing purpose, placement environment, network environment, and network status with respect to the image capturing apparatus 103, the synchronization signal output apparatus 101, and the like.

As described above, in this embodiment, the synchronization accuracy determination unit 206 determines the operation mode related to update of the internal signal for generating the synchronization signal in accordance with the magnitude of the time error between the synchronization signal output apparatus 101 and the time server 102. Note that "the magnitude of the error" in this example indicates an error while the synchronization signal output apparatus 101 establishes synchronization with the time server 102 (YES in step S302), and can thus be considered as the magnitude of the jitter of the error. As described above, the magnitude of the error also corresponds to the magnitude of the jitter of the reference signal generated based on the internal clock 201. Therefore, if a jitter of a transmission delay in a transmission path between the synchronization signal output apparatus 101 and the time server 102 is large, it is possible to select the self-running mode to prevent the internal signal from fluctuating in accordance with the jitter. Furthermore, if the jitter of the transmission delay between the synchronization signal output apparatus 101 and the time server 102 is not so large as to select the self-running mode, the internal signal is adjusted by tracking the reference signal generated in accordance with the time obtained from the time server 102. At this time, if the magnitude of the jitter of the transmission delay is large to some extent, the internal signal is made to track the reference signal with low accuracy, thereby making it possible to generate the synchronization signal in accordance with the time obtained from the time server 102 while reducing the influence of the jitter of the transmission delay. If the magnitude of the jitter of the transmission delay is sufficiently small, the internal signal is made to track the reference signal with high accuracy, thereby making it possible to generate the synchronization signal at accurate time.

Figure 5:
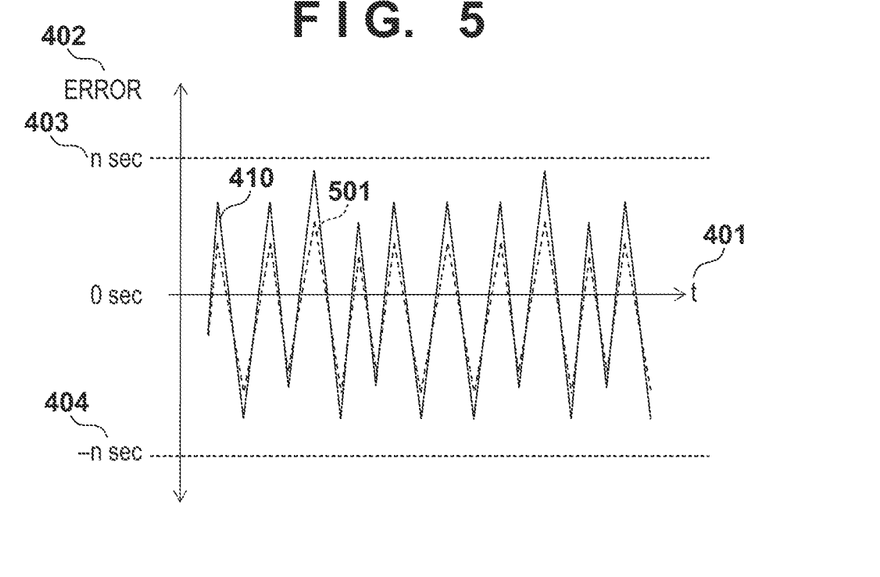
FIG. 5 is a timing chart showing a concept of an operation in a high-sensitivity feedback mode.
Figure 6:
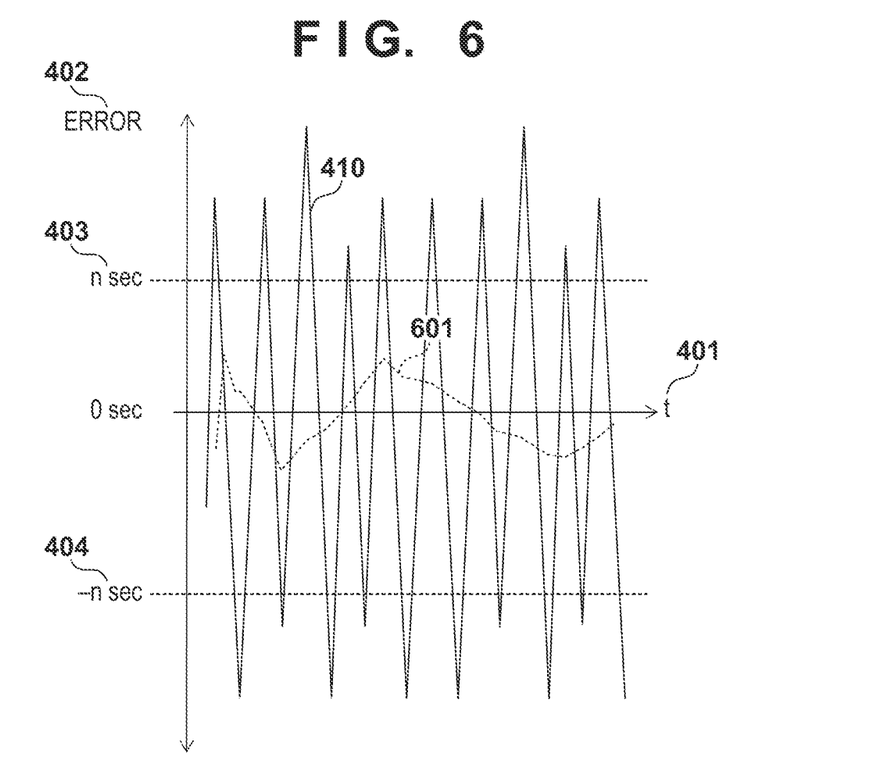
FIG. 6 is a timing chart showing a concept of an operation in a low-sensitivity feedback mode.

Subsequently, operation examples when the synchronization signal generation unit 205 operates in the high-sensitivity feedback mode and the low-sensitivity feedback mode will be described with reference to FIGS. 5 and 6. FIG. 5 shows an operation example in the high-sensitivity feedback mode. FIG. 6 shows an operation example in the low-sensitivity feedback mode. Note that in FIGS. 5 and 6, the same reference numerals as in FIG. 4 denote the same items and a description thereof will be omitted.

Referring to FIG. 5, a broken-line curve 501 schematically shows a state in which the internal signal generated by the synchronization signal generation unit 205 is made to track, with high sensitivity, the variation of the reference signal output based on the internal clock 201. In accordance with the phase difference between the internal signal and the reference signal of the internal clock 201, the synchronization signal generation unit 205 performs adjustment to reflect the phase difference on the internal signal generated by the synchronization signal generation unit 205. For example, it is possible to make the internal signal track the variation of the time information with high sensitivity by setting a large weight for the integer constant strongly influenced by the current phase difference, as compared to the proportionality constant influenced by the past phase difference, and applying a variation amount of the immediately preceding reference signal to the internal signal. This makes it possible to reflect the time difference between the time server 102 and the internal clock 201 on the internal signal with high sensitivity based on the result of periodically executing, by the time synchronization unit 203, the time synchronization processing with the time server 102 by PTP.

Referring to FIG. 6, a broken-line curve 601 schematically shows a state in which the internal signal generated by the synchronization signal generation unit 205 is made to track, with low sensitivity, the variation of the reference signal output based on the internal clock 201. When operating in the low-sensitivity feedback mode, the synchronization signal generation unit 205 can adjust the internal signal with low sensitivity by setting a large weight for the proportionality constant influenced by the past phase difference, as compared to the integer constant strongly influenced by the current phase difference. Alternatively, the synchronization signal generation unit 205 can correct the internal signal with low sensitivity with respect to the phase amount with the immediately preceding reference signal by suppressing the maximum value or minimum value of the adjustment amount of the internal signal to a small value. By decreasing the speed at which the internal signal tracks the reference signal generated by the internal clock 201, a jitter of a period for generating the internal signal and the synchronization signal can be made to gradually vary even if the frequency of the reference signal generated by the internal clock 201 varies.

If the internal signal tracks the internal clock 201 with high sensitivity when a fluctuation of the reference signal is large, the frequency of the synchronization signal largely fluctuates, and thus it is assumed that the allowable range of the jitter of the synchronization signal in the image capturing apparatus 103 is exceeded. If the allowable range of the jitter of the synchronization signal is exceeded, the image capturing apparatus 103 cannot perform continuous image capturing. To cope with this, the synchronization accuracy determination unit 206 determines that a jitter of the internal clock 201 exceeds the threshold, and prevents the internal signal from tracking the internal clock 201 or makes the internal signal track the internal clock 201 with low sensitivity, thereby making it possible to prevent the frequency of the synchronization signal from largely varying. As described above, the speed at which the phase of the frequency of the internal signal generated by the synchronization signal generation unit 205 is changed is changed in accordance with the magnitude of the error between the time of the time server 102 and the time of the internal clock 201, and such change is not performed in some cases. Thus, even if the phase of the reference signal of the internal clock 201 largely changes, it is possible to output the synchronization signal within the allowable range of the jitter of the synchronization signal in the image capturing apparatus 103, and the image capturing apparatus 103 can execute continuous image capturing in accordance with the synchronization signal.

Note that information of the operation mode (high-sensitivity feedback mode, low-sensitivity feedback mode, or self-running mode) set by the synchronization signal generation unit 205 may be output together with the synchronization signal. In this case, for example, the image capturing apparatus 103 may include, as meta data, the information of the operation mode at the time of image capturing in a captured video. The synchronization signal output apparatus 101 may store time and the operation mode used at the time in association with each other. Then, when the image capturing apparatus 103 obtains captured video data, it may include, as meta data, the information of the operation mode in the video data. Furthermore, simultaneously with the synchronization signal, mode information may be set in, for example, a user field included in a time code signal defined by SMPTE. Note that SMPTE stands for Society of Motion Picture and Television Engineers. This allows the image capturing apparatus 103 to specify the synchronization accuracy of the timing of the captured video with respect to the time of the time server 102.

As described above, in accordance with the magnitude of the jitter of the time difference between the synchronization signal output apparatus 101 and the time server 102, the synchronization signal output apparatus 101 changes the operation mode related to the operation of adjusting the internal signal by the synchronization signal generation unit 205. The synchronization signal output apparatus 101 changes the operation mode to output the synchronization signal indicating a different timing in accordance with the time difference between the self apparatus and the time server 102. Thus, if the jitter is small, the synchronization signal output apparatus 101 can output the synchronization signal corresponding to the time of the time server 102 with high accuracy. Even if the jitter is large, the synchronization signal output apparatus 101 can suppress the accuracy of the synchronization signal within the allowable range of the jitter of the synchronization signal in the image capturing apparatus 103. Furthermore, if the jitter is larger, the synchronization signal output apparatus 101 uses the self-running mode in which no synchronization signal is adjusted, thereby making it possible to prevent the image capturing apparatus 103 from entering a state in which it is impossible to continue image capturing. If the jitter is large, the synchronization signal output apparatus 101 outputs the synchronization signal indicating a timing based on the internal clock 201 without using the time information from the time server 102. This allows the image capturing apparatus 103 to perform synchronous image capturing continuously, regardless of a jitter in the time difference between the synchronization signal output apparatus 101 and the time server 102. The synchronization signal output apparatus 101 is suppressed from generating the synchronization signal based on the time information having a large jitter. Therefore, since it is possible to maintain image capturing synchronization among the plurality of image capturing apparatuses 103 with higher accuracy, it is possible to perform image capturing for generating a higher-quality virtual point-of-view content.

Note that in the above description, the three operation modes are used. However, the present invention is not limited to this. For example, four or more operation modes may be prepared by preparing three or more weighting settings for the above-described proportionality constant and integer constant, and defining, in addition to the self-running mode, feedback modes of making the internal signal track the reference signal with three or more accuracy levels. In this case, the operation mode can be selected so that the feedback mode of making the internal signal track the reference signal with higher accuracy as the magnitude of the jitter of the time difference between the synchronization signal output apparatus 101 and the time server 102 is smaller. The plurality of feedback modes need not be defined, and only two operation modes, that is, the self-running mode and one feedback mode of making the internal signal track the reference signal with specific accuracy may be used. That is, if the magnitude of the jitter of the time difference between the synchronization signal output apparatus 101 and the time server 102 is larger than a predetermined threshold, the self-running mode may be selected; otherwise, the feedback mode may be selected. Furthermore, the self-running mode need not be used. For example, only a high-accuracy feedback mode and a low-accuracy feedback mode or only three or more feedback modes may be used.

A case in which the synchronization signal output apparatus 101 supplies the synchronization signal so that the plurality of image capturing apparatuses 103 perform image capturing in synchronism with each other has been described above. However, the synchronization signal may be used at the time of obtaining data other than video data. For example, to record sound data, the synchronization signal output apparatus 101 supplies the synchronization signal to a plurality of recording apparatuses, and the recording apparatuses perform sound recording based on the synchronization signal, thereby obtaining sound data that gives a realistic feeding. The synchronization signal output apparatus 101 may output the synchronization signal to synchronize timings of outputting various kinds of data such as a video, sound, and radio wave.

According to the present invention, when generating a synchronization signal based on time information, it is possible to reduce the influence of a jitter of the time information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094083, filed May 10, 2017, which is hereby incorporated by reference herein in its entirety.

What is claimed is:

1. A signal output apparatus, comprising:
an output unit configured to output, based on an internal signal generated based on a time of an internal clock of the signal output apparatus, a synchronization signal for controlling image capturing in a plurality of image capturing apparatuses;
an obtaining unit configured to obtain a time difference between a time of a time server and the time of the internal clock; and
an adjusting unit configured to change a frequency of the internal signal based on the obtained time difference to reduce the time difference,
wherein, in a first case where the time difference is smaller than a first predetermined threshold, the adjusting unit changes the frequency of the internal signal with a first sensitivity based on a phase difference between the internal signal and a reference signal generated based on the time of the time server, and the output unit outputs the synchronization signal based on the internal signal whose frequency has been changed, and
wherein, in a second case where the difference is larger than the first predetermined threshold, the adjusting unit changes the frequency of the internal signal with a second sensitivity that is lower than the first sensitivity, and the output unit outputs the synchronization signal based on the internal signal whose frequency has been changed.

2. The apparatus according to claim 1, wherein the adjusting unit does not change the frequency of the internal signal in a third case where the time difference is larger than a second predetermined threshold, which is larger than the first predetermined threshold.

3. The apparatus according to claim 1, wherein
the output unit outputs the synchronization signal for controlling image capturing to at least one image capturing apparatus of the plurality of image capturing apparatuses, and
the image capturing apparatus performs image capturing based on the synchronization signal.

4. The apparatus according to claim 1, wherein the signal output apparatus includes an apparatus supplied with the synchronization signal.

5. The apparatus according to claim 1, wherein the signal output apparatus is an apparatus separate from an apparatus supplied with the synchronization signal.

6. A control method for a signal output apparatus, comprising:
outputting, based on an internal signal generated based on a time of an internal clock of the signal output apparatus, a synchronization signal for controlling image capturing in a plurality of image capturing apparatuses;

obtaining a time difference between a time of a time server and the time of the internal clock; and changing a frequency of the internal signal based on the obtained time difference to reduce the time difference, wherein, in a first case where the time difference is smaller than a first predetermined threshold, the frequency of the internal signal is changed with a first sensitivity based on a phase difference between the internal signal and a reference signal generated based on the time of the time server, and the synchronization signal is output based on the internal signal whose frequency has been changed, and wherein, in a second case where the time difference value is larger than the first predetermined threshold, the frequency of the internal signal is changed with a second sensitivity that is lower than the first sensitivity, and the synchronization signal is output based on the internal signal whose frequency has been changed.

7. A non-transitory computer-readable storage medium storing a computer program for causing a computer, included in a signal output apparatus, to:

output, based on an internal signal generated based on a time of an internal clock of the signal output apparatus, a synchronization signal for controlling image capturing in a plurality of image capturing apparatuses;

obtain a time difference between a time of a time server and the time of the internal clock; and change a frequency of the internal signal based on the obtained time difference to reduce the time difference, wherein, in a first case where the time difference is smaller than a first predetermined threshold, the frequency of the internal signal is changed with a first sensitivity based on a phase difference between the internal signal and a reference signal generated based on the time of the time server, and the synchronization signal is output based on the internal signal whose frequency has been changed, and wherein, in a second case where the time difference is larger than the first predetermined threshold, the frequency of the internal signal is changed with a second sensitivity that is lower than the first sensitivity, and the synchronization signal is output based on the internal signal whose frequency has been changed.

8. The apparatus according to claim 1, wherein the adjusting unit changes the frequency of the internal signal based on an instantaneous value of the phase difference in the first case, and the adjusting unit changes the frequency of the internal signal based on a cumulative value of the phase difference in a predetermined period in the second case.

9. The method according to claim 6, wherein, in the changing, the frequency of the internal signal is not changed in a third case where the time difference is larger than a second predetermined threshold which is larger than the first predetermined threshold.

10. The method according to claim 6, wherein the synchronization signal for controlling image capturing is output to at least one image capturing apparatus of the plurality of image capturing apparatuses, and the image capturing apparatus performs image capturing based on the synchronization signal.

* * * * *